US011605991B2

(12) United States Patent
Yabe et al.

(10) Patent No.: US 11,605,991 B2
(45) Date of Patent: Mar. 14, 2023

(54) ELECTRIC MOTOR, COMPRESSOR, AIR BLOWER, AND REFRIGERATING AND AIR CONDITIONING APPARATUS

(71) Applicant: Mitsubishi Electric Corporation, Tokyo (JP)

(72) Inventors: Koji Yabe, Tokyo (JP); Takanori Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 126 days.

(21) Appl. No.: 16/968,708

(22) PCT Filed: Mar. 27, 2018

(86) PCT No.: PCT/JP2018/012343
§ 371 (c)(1),
(2) Date: Aug. 10, 2020

(87) PCT Pub. No.: WO2019/186682
PCT Pub. Date: Oct. 3, 2019

(65) Prior Publication Data
US 2020/0412185 A1 Dec. 31, 2020

(51) Int. Cl.
*H02K 1/27* (2022.01)
*H02K 1/24* (2006.01)
(Continued)

(52) U.S. Cl.
CPC ............... *H02K 1/27* (2013.01); *H02K 1/24* (2013.01); *H02K 5/16* (2013.01); *H02K 9/00* (2013.01)

(58) Field of Classification Search
CPC .. H02K 1/27; H02K 1/24; H02K 5/16; H02K 9/00; H02K 2201/03; H02K 5/163;
(Continued)

(56) References Cited

U.S. PATENT DOCUMENTS

2002/0047434 A1\* 4/2002 Koharagi ............... H02K 21/16
310/156.56
2002/0051715 A1 5/2002 Matsumoto et al.
(Continued)

FOREIGN PATENT DOCUMENTS

CN 1409459 A 4/2003
CN 103929032 A 7/2014
(Continued)

OTHER PUBLICATIONS

JP2008131783AEnglishtranslation (Year: 2022).\*
(Continued)

*Primary Examiner* — Tulsidas C Patel
*Assistant Examiner* — Viswanathan Subramanian
(74) *Attorney, Agent, or Firm* — Posz Law Group, PLC

(57) ABSTRACT

An electric motor includes: a rotor including a first rotor core and a second rotor core; and a stator. A minimum distance from the first rotor core to the stator is shorter than a minimum distance from the second rotor core to the stator. A maximum radius of the first rotor core is longer than a maximum radius of the second rotor core. A shape of a first thin-wall part of the first rotor core and a shape of a second thin-wall part of the second rotor core are the same.

12 Claims, 12 Drawing Sheets

(51) Int. Cl.
*H02K 5/16* (2006.01)
*H02K 9/00* (2006.01)

(58) Field of Classification Search
CPC .... H02K 7/085; H02K 2213/03; H02K 1/276; H02K 1/22; H02K 1/12; H02K 5/04
See application file for complete search history.

(56) References Cited

U.S. PATENT DOCUMENTS

| | | | | |
|---|---|---|---|---|
| 2003/0042814 | A1* | 3/2003 | Tagome | H02K 16/02 310/156.08 |
| 2008/0018190 | A1* | 1/2008 | Takahata | H02K 1/276 310/156.55 |
| 2013/0313938 | A1* | 11/2013 | Yamada | H02K 1/2706 310/156.69 |
| 2014/0144412 | A1 | 5/2014 | An et al. | |
| 2019/0074738 | A1 | 3/2019 | Yabe et al. | |

FOREIGN PATENT DOCUMENTS

| | | | | |
|---|---|---|---|---|
| EP | 1289101 | A2 | | 3/2003 |
| JP | S59-90263 | U | | 6/1984 |
| JP | H02-068645 | U | | 5/1990 |
| JP | H06-024383 | U | | 3/1994 |
| JP | 2008131783 | A | * | 6/2008 ............. H02K 1/276 |
| JP | 2009-236120 | A | | 10/2009 |
| JP | 2011-217443 | A | | 10/2011 |
| JP | 2012-085434 | A | | 4/2012 |
| JP | 2012-100502 | A | | 5/2012 |
| JP | 2013-024041 | A | | 2/2013 |
| JP | 2013-046486 | A | | 3/2013 |
| JP | 6157340 | B | | 7/2017 |
| KR | 10-2001-0109163 | A | | 12/2001 |
| WO | 2009/084245 | A1 | | 7/2009 |
| WO | 2017-122289 | A1 | | 7/2017 |
| WO | 2017-203618 | A1 | | 11/2017 |

OTHER PUBLICATIONS

Australian Examination Report dated Mar. 23, 2021, issued in corresponding Australian Patent Application No. 2018416090.
Indian Office Action dated Mar. 19, 2021, issued in corresponding Indian Patent Application No. 202027034722 (and English Machine Translation).
Japanese Office Action dated Apr. 6, 2021, issued in corresponding Japanese Patent Application No. 2020-510226 (and English Machine Translation).
European Search Report dated Mar. 3, 2021, issued in corresponding European Patent Application No. 18912930.7.
Japanese Office Action dated Feb. 2, 2021, issued in corresponding JP Patent Application No. 2020-510226 (and English Machine Translation).
Office Action dated May 25, 2022 in connection with counterpart Korean Patent Application No. 10-2020-7025360 (and English machine translation).
Office Action dated Oct. 21, 2022 issued in corresponding Chinese patent application No. 201880090939.8 (and English machine translation).

* cited by examiner

… (1) …

ELECTRIC MOTOR, COMPRESSOR, AIR BLOWER, AND REFRIGERATING AND AIR CONDITIONING APPARATUS

CROSS REFERENCE TO RELATED APPLICATION

This application is a U.S. national stage application of PCT/JP2018/012343 filed on Mar. 27, 2018, the contents of which are incorporated herein by reference.

TECHNICAL FIELD

The present invention relates to an electric motor eluding a permanent magnet.

BACKGROUND ART

In general, an electric motor including a rotor whose shaft is supported only on one side in an axial direction. In such an electric motor, while the electric motor is being driven, a bearing supporting the shaft serves as a fulcrum, and the shaft is warped in some cases. When the shaft is warped, the position of the rotor moves in a radial direction, and accordingly, the rotor may contact a stator. In view of this, proposed is an electric motor in which an air gap on a free end side is set large and an air gap at a support side is set smaller than the air gap on the free end side (e.g., Patent Reference 1).

PRIOR ART REFERENCE

Patent Reference

Patent Reference 1: Japanese Unexamined Utility Model Registration Application Publication No. H02-68645

SUMMARY OF THE INVENTION

Problem to be Solved by the Invention

In a conventional technique, if the outer diameter of a rotor core is increased in order to reduce the size of an air gap, the width of an inter-pole part, for example, a thin-wall part, of the rotor core increases in size. Accordingly, leakage of magnetic fluxes easily occurs near the inter-pole part. On the other hand, if the outer diameter of the rotor core is reduced in order to reduce leakage of magnetic fluxes near the inter-pole part, the air gap is enlarged, and a magnetic force in the electric motor decreases, disadvantageously.

It is therefore an object of the present invention to reduce leakage of magnetic fluxes in a rotor and enhance a magnetic force in an electric motor.

An electric motor according to the present invention includes: a stator; and a rotor including a shaft, a first rotor core fixed on a first side of the shaft in an axial direction, and a second rotor core fixed on a second side of the shaft, the second side being opposite to the first side in the axial direction, the rotor being disposed inside the stator, wherein the shaft is supported only on the first side, a minimum distance from the first rotor core to the stator in a radial direction is shorter than a minimum distance from the second rotor core to the stator in the radial direction, a maximum radius of the first rotor core is longer than a maximum radius of the second rotor core, the first rotor core includes a first hole and a first thin-wall part, the first thin-wall part being located outside the first hole in the radial direction, the second rotor core includes a second hole and a second thin-wall part, the second thin-wall part being located outside the second hole in the radial direction, and a shape of the first thin-wall part and a shape of the second thin-wall part are the same.

Effects of the Invention

According to the present invention, leakage of magnetic fluxes in the rotor is reduced, and a magnetic force is enhanced in the electric motor.

MODE FOR CARRYING OUT THE INVENTION

First Embodiment

An embodiment of the present invention will be described in detail with reference to the drawings.

In an xyz orthogonal coordinate system shown in each drawing, a z axis direction (z axis) represents a direction parallel to an axis line Ax of an electric motor 1, an x axis direction (x axis) represents a direction perpendicular to the z axis direction (z axis), and a y axis direction (y axis) represents a direction perpendicular to both of the z axial direction and the x axial direction. The axis line Ax is a rotation center of a rotor 2. The direction parallel to the axis line Ax will be also referred to as an "axial direction of the rotor 2" or simply an "axial direction," A radial direction is a direction perpendicular to the axis line Ax.

Figure 1:
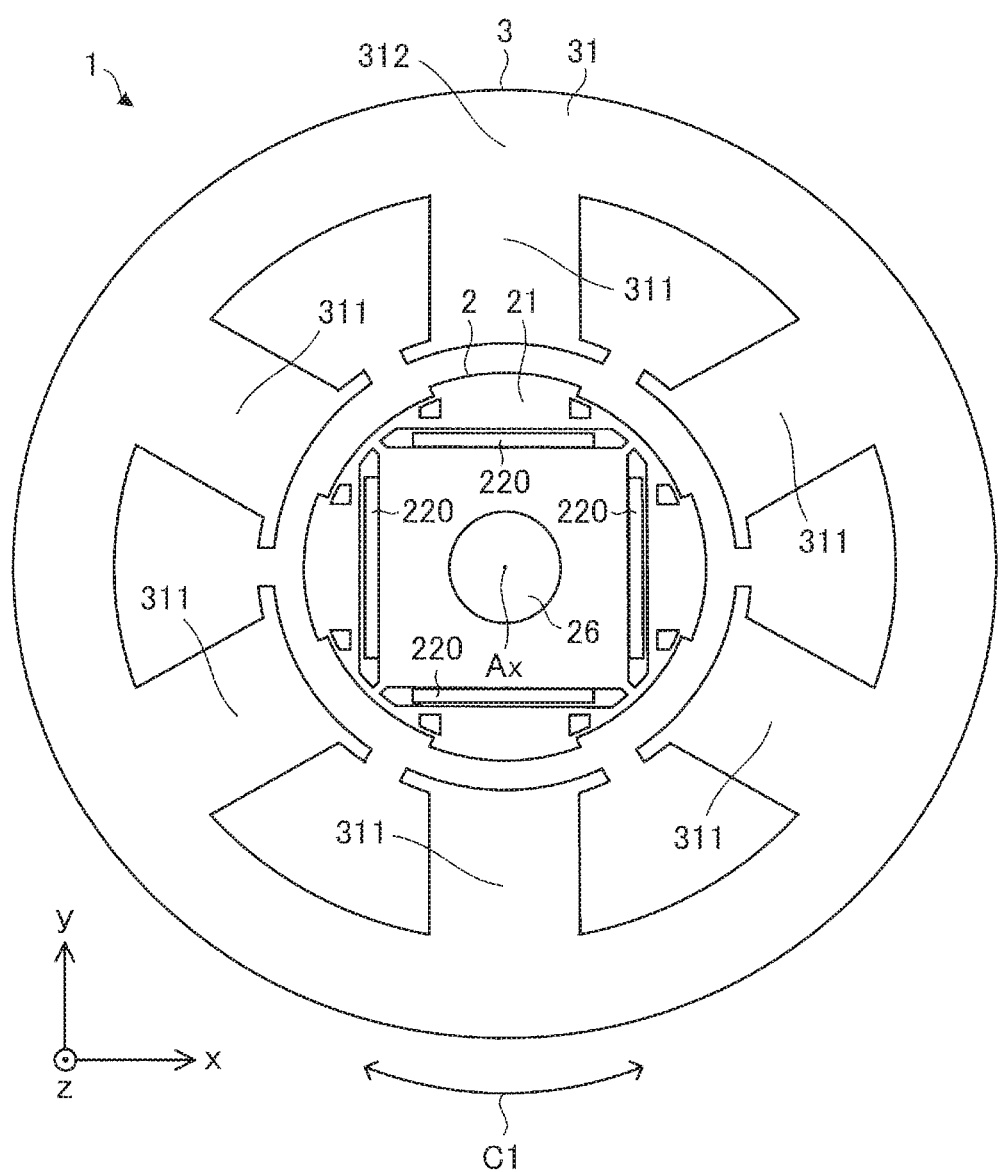
FIG. 1 is a plan view schematically illustrating a structure of a first side of an electric motor according to a first embodiment of the present invention.

FIG. 1 is a plan view schematically illustrating a structure of a first side of an electric motor 1 according to a first embodiment of the present invention. In the electric motor 1 illustrated in FIG. 1, a bearing 4 is detached from a shaft 26. An arrow C1 represents a circumferential direction of a stator 3 about the axis line Ax. The arrow C1 also represents a circumferential direction of the rotor 2 about the axis line Ax. The circumferential directions of the rotor 2 and the stator 3 will be also simply referred to as a "circumferential direction."

Figure 2:
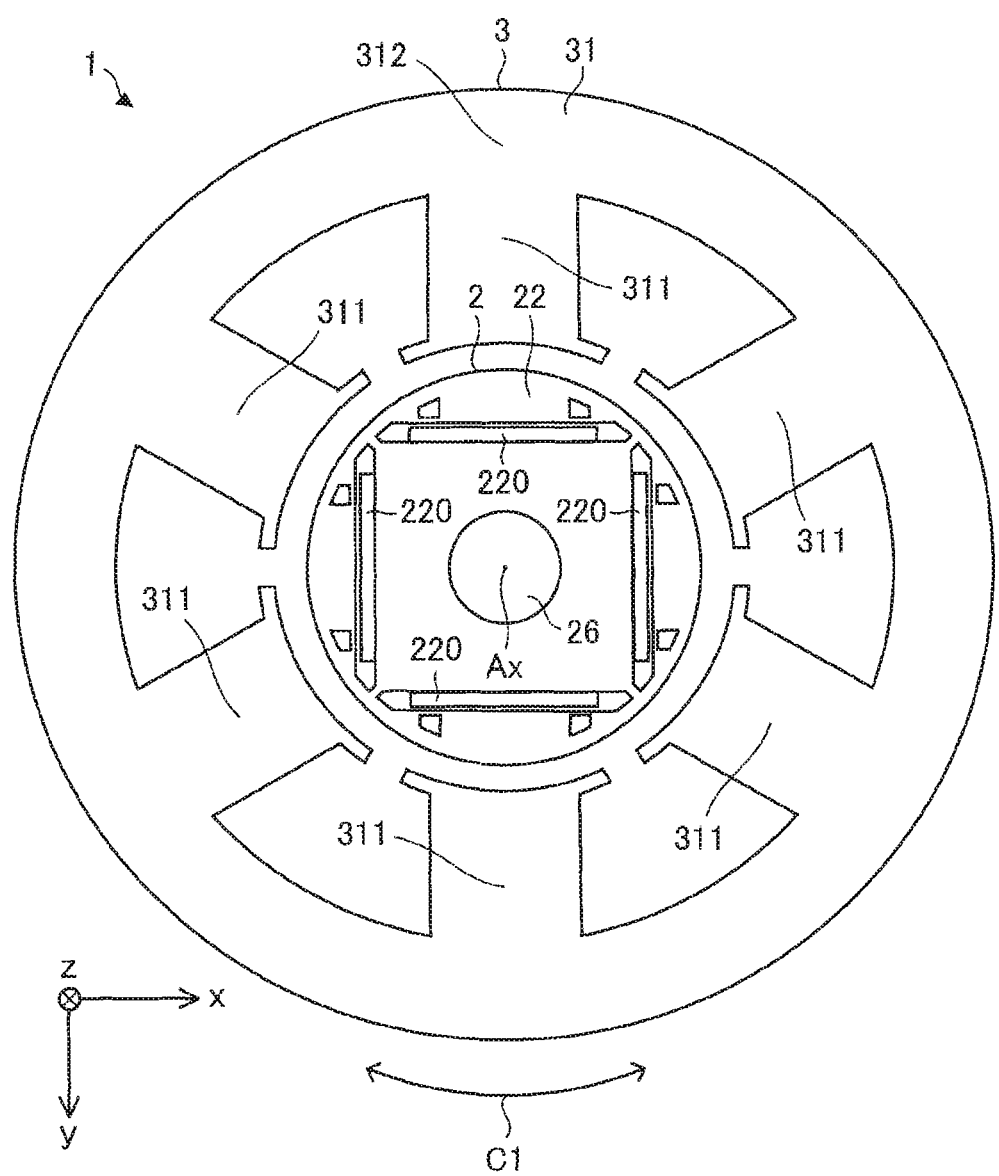
FIG. 2 is plan view schematically illustrating the structure of a second side of the electric motor.

FIG. 2 is a plan view schematically illustrating the structure of a second side of the electric motor 1.

Figure 3:
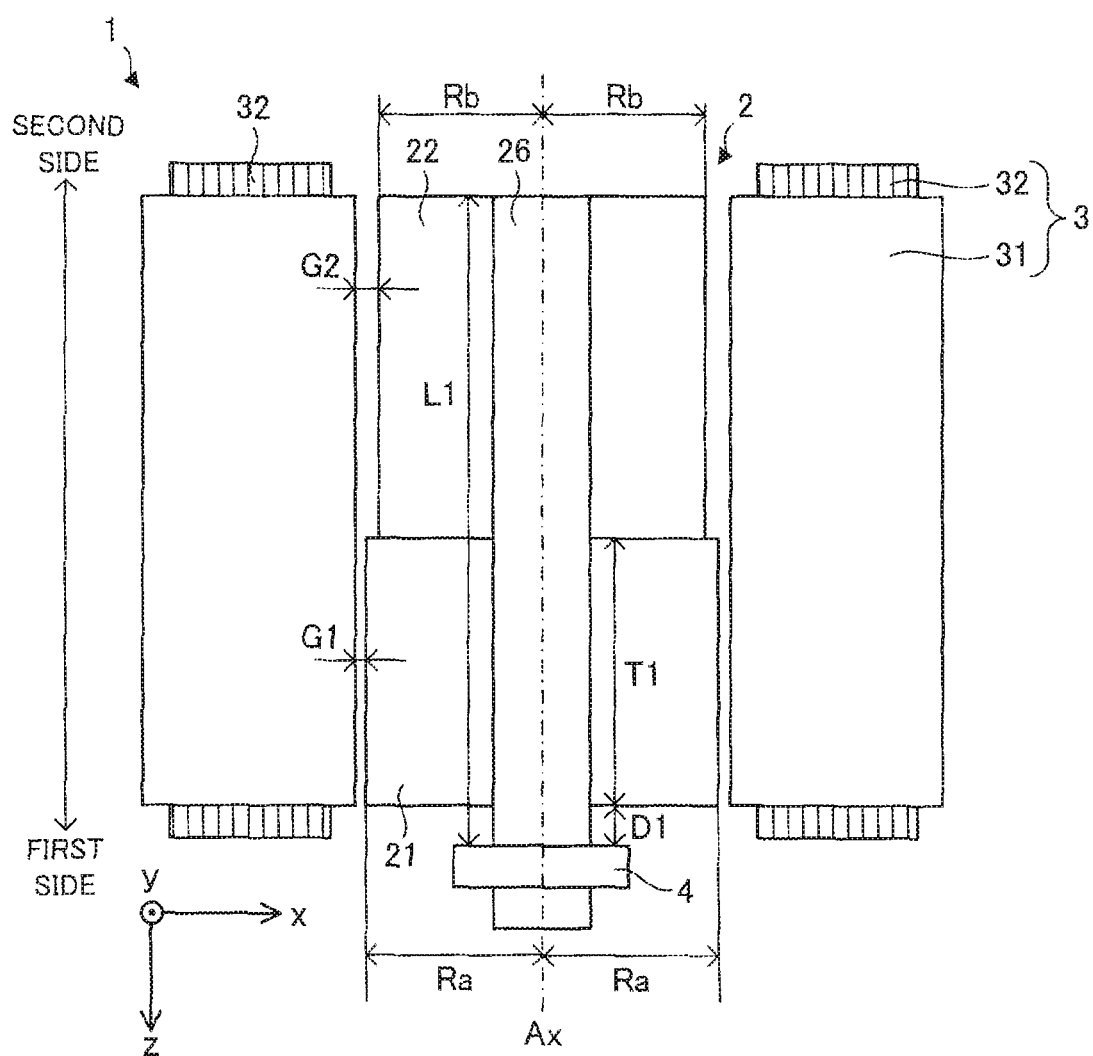
FIG. 3 is a cross-sectional view schematically illustrating the structure of the electric motor.

FIG. 3 is a cross-sectional view schematically illustrating the structure of the electric motor 1. In FIG. 3, the lower side (i.e., +z side) is the first side, and the upper side (i.e., −z side) is the second side. In this embodiment, the first side will be also referred to as a bearing side, and a second side will be also referred to as a counter bearing side.

The electric motor 1 includes the rotor 2, the stator 3, and the bearing 4. The electric motor 1 is, for example, a permanent magnet synchronous motor (also called a brushless DC motor) such as an interior permanent magnet electric motor. The electric motor 1 is used as an electric motor in a high-efficiency hermetic compressor for use in a refrigeration cycle apparatus, for example.

As illustrated in FIGS. 1 and 2, the stator 3 includes stator core 31. As illustrated in FIG. 3, the stator 3 also includes a winding 32 wound around the stator core 31. In the stator 3 illustrated in FIGS. 1 and 2, the winding 32 is detached from the stator core 31. For example, an insulator is disposed between the stator core 31 and the winding 32. In the case where the electric motor 1 is driven, a current is supplied to the winding 32 and thus the rotor 2 rotates.

As illustrated in FIGS. 1 and 2, the stator core 31 includes at least one tooth 311 extending in the radial direction, and a yoke 312 extending in the circumferential direction. In the example illustrated in FIG. 1, the stator core 31 includes a plurality of teeth 311 (specifically six teeth 311).

The stator core 31 is formed annularly. The stator core 31 is formed by stacking a plurality of electromagnetic steel sheets in the axial direction. Each of the plurality of electromagnetic steel sheets is stamped into a predetermined shape. The inner peripheral surface of the stator 3 (specifically the inner peripheral surface of the stator core 31) has a uniform curvature radius. That is, in an xy plane, the distance from the axis line Ax to the teeth 311 is uniform in the circumferential direction.

The rotor 2 is rotatably disposed inside the stator 3 in the radial direction. The rotor 2 includes a first rotor core 21, a second rotor core 22, at least one permanent magnet 220, and a shaft 26. In the example illustrated in FIGS. 1 through 3, the rotation axis of the rotor 2 coincides with the axis line Ax.

As illustrated in FIG. 3, the first rotor core 21 is fixed to the first side of the shaft 26 in the axial direction. The second rotor core 22 is fixed to the second side of the shaft 26, and the second side is opposite to the first side in the axial direction.

The bearing 4 supports the first side of the shaft 26. Accordingly, the shaft 26 is supported only on the first side.

A distance L1 is a minimum distance from an end of the shaft 26 on the second side in the axial direction to the bearing 4. A distance D1 is a minimum distance from the first rotor core 21 to the bearing 4. A thickness T1 is a thickness of the first rotor core 21 in the axial direction. A distance G1 is a minimum distance from the first rotor core 21 to the stator 3 in a case where the rotation axis of the rotor 2 coincides with the center of the stator 3 in a plane perpendicular to the axial direction. A distance G2 is a minimum distance from the second rotor core 22 to the stator 3 in a case where the rotation center of the rotor 2 coincides with the center of the stator 3 in the xy plane. In the case where the rotation center of the rotor 2 coincides with the center of the stator 3 in a plane perpendicular to the axial direction, the rotation center of the rotor 2 coincides with the axis line Ax. That is, the axis line Ax is also a line indicating the center of the stator 3.

When the shaft 26 tilts in a zx plane, the maximum travel distance of the first side of the rotor 2, specifically, the first rotor core 21, in the radial direction is approximated at $G2 \times (D1+T1)/L1$. Thus, an air gap between the first side of the rotor 2, specifically, the first rotor core 21, and the stator 3, needs to be larger than $G2 \times (D1+T1)/L1$. Thus, the distance G1 needs to be larger than $G2 \times (D1+T1)/L1$. Accordingly, in the example illustrated in FIG. 3, the electric motor 1 satisfies $G1 > G2 \times (D1+T1)/L1$.

Figure 4:
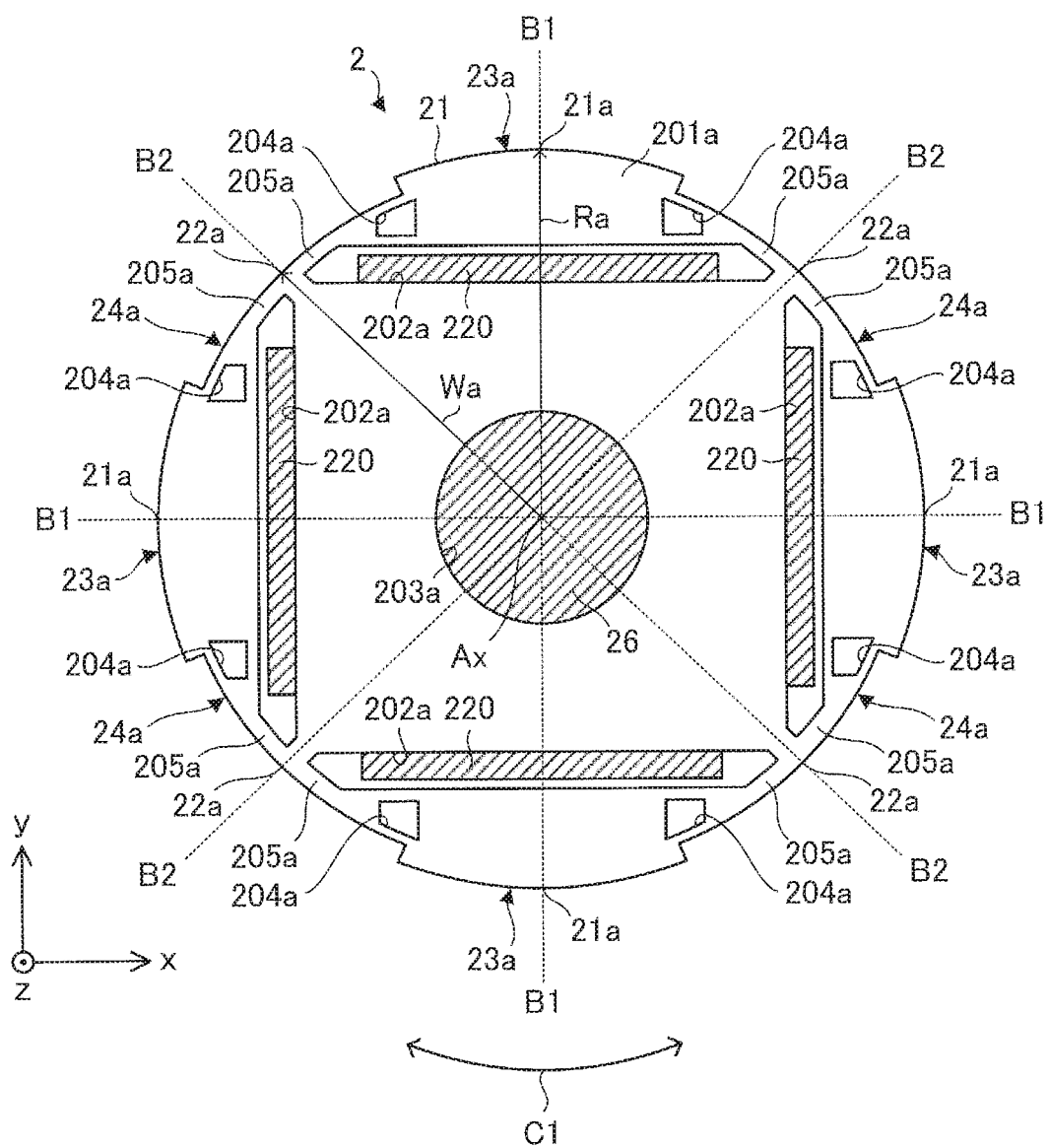
FIG. 4 is a cross-sectional view schematically illustrating a structure of a first side of a rotor.

FIG. 4 is a cross-sectional view schematically illustrating a structure of the first side of the rotor 2.

The first rotor core 21 includes a plurality of electromagnetic steel sheets 201a stacked in the axial direction, at least one hole 202a (also referred to as a first hole), a shaft hole 203a, at least one hole 204a, and at least one first thin-wall part 205a. The first rotor core 21 has a substantially cylindrical shape.

Each of the plurality of electromagnetic steel sheets 201a has a thickness of 0.1 mm or more and 0.25 mm or less. Each of the electromagnetic steel sheets 201a is formed by stamping into a predetermined shape. The at least one hole 202a, the shaft hole 203a, the at least one hole 204a, and the at least one first thin-wall part 205a are formed in each of the plurality of electromagnetic steel sheets 201a. The shaft hole 203a is formed in a plane perpendicular to the axial direction, that is, at the center of the electromagnetic steel sheets 201a in the xy plane.

In this embodiment, the hole 202a is a hole closest to the inter-pole part among holes formed in the electromagnetic steel sheets 201a (except for the shaft hole 203a) in the plane perpendicular to the axial direction, that is, in the xy plane.

In the example illustrated in FIG. 4, a plurality of holes 202a (specifically four holes 202a) are arranged in the circumferential direction. In the example illustrated in FIG. 4, the number of holes 202a is equal to the number of magnetic poles of the rotor 2.

In the example illustrated in FIG. 4, the permanent magnets 220 are inserted in the holes 202a. The permanent magnets 220 are, for example, rare earth magnets. The permanent magnets 220, however, are not limited to rare earth magnets. The width of each permanent magnet 220 in the radial direction is smaller than the width of each hole 202a in the radial direction.

As illustrated in FIG. 4, each of the permanent magnets 220 is located on the inner side in a corresponding one of the holes 202a in the radial direction. Thus, a gap is formed between the inner wall defining the hole 202a and the outer surface of the permanent magnet 220 in the radial direction. In the gap, oil or a refrigerant may be present.

The at least one first thin-wall part 205a is located outside the holes 202a in the radial direction. Specifically, the at least one first thin-wall part 205a is formed between the holes 202a and the outer edge of the first rotor core 21. In the example illustrated in FIG. 4, a plurality of first thin-wall parts 205a (specifically eight first thin-wall parts 205a) are formed in the first rotor core 21. Each of the first thin-wall parts 205a extends along the circumferential direction.

As illustrated in FIG. 4, the first rotor core 21 also includes first portions 21a located at magnetic pole center parts of the rotor 2, second portions 22a located at inter-pole parts of the rotor 2, outer peripheral surfaces 23a (also referred to as first outer peripheral surfaces) including the first portions 21a, and outer peripheral surfaces 24a (also referred to as second outer peripheral surfaces) including the second portions 22a.

In the xy plane, the first portions 21a are end portions of the first rotor core 21 in the radial direction. Similarly, in the xy plane, the second portions 22a are end portions of the first rotor core 21 in the radial direction. The first portions 21a and the second portions 22a form part of the outer edge of the first rotor core 21.

The magnetic pole center parts of the rotor 2 are parts of the rotor 2 through which magnetic pole center lines B1 pass. Each of the magnetic pole center lines B1 indicated by a broken line is a line passing through the center of the permanent magnet 220 and the rotation center of the rotor 2 in the xy plane.

The inter-pole parts of the rotor 2 are parts of the rotor 2 through which inter-pole lines B2 pass. Each of the inter-pole lines B2 indicated by a broken line is a line passing through an intermediate point between two adjacent permanent magnets 220 and the rotation center of the rotor 2 in the xy plane.

The outer peripheral surfaces 23a project outward in the radial direction compared with the outer peripheral surfaces 24a. In the xy plane, a distance Ra (also referred to as a radius Ra) from the rotation center of the rotor 2 to the first portions 21a is larger than a distance Wa (also referred to as a radius Wa) from the rotation center of the rotor 2 to the second portions 22a. In other words, the radius Ra of the first rotor core 21 at the magnetic pole center parts is larger than the radius Wa of the first rotor core 21 at the inter-pole parts. Thus, a minimum distance from the second portions 22a to the stator core 31 is larger than a minimum distance from the first portions 21a to the stator core 31, in other words, an air gap between the first rotor core 21 and the stator core 31 in the inter-pole parts is larger than an air gap between the first rotor core 21 and the stator core 31 in the magnetic pole center parts.

Figure 5:
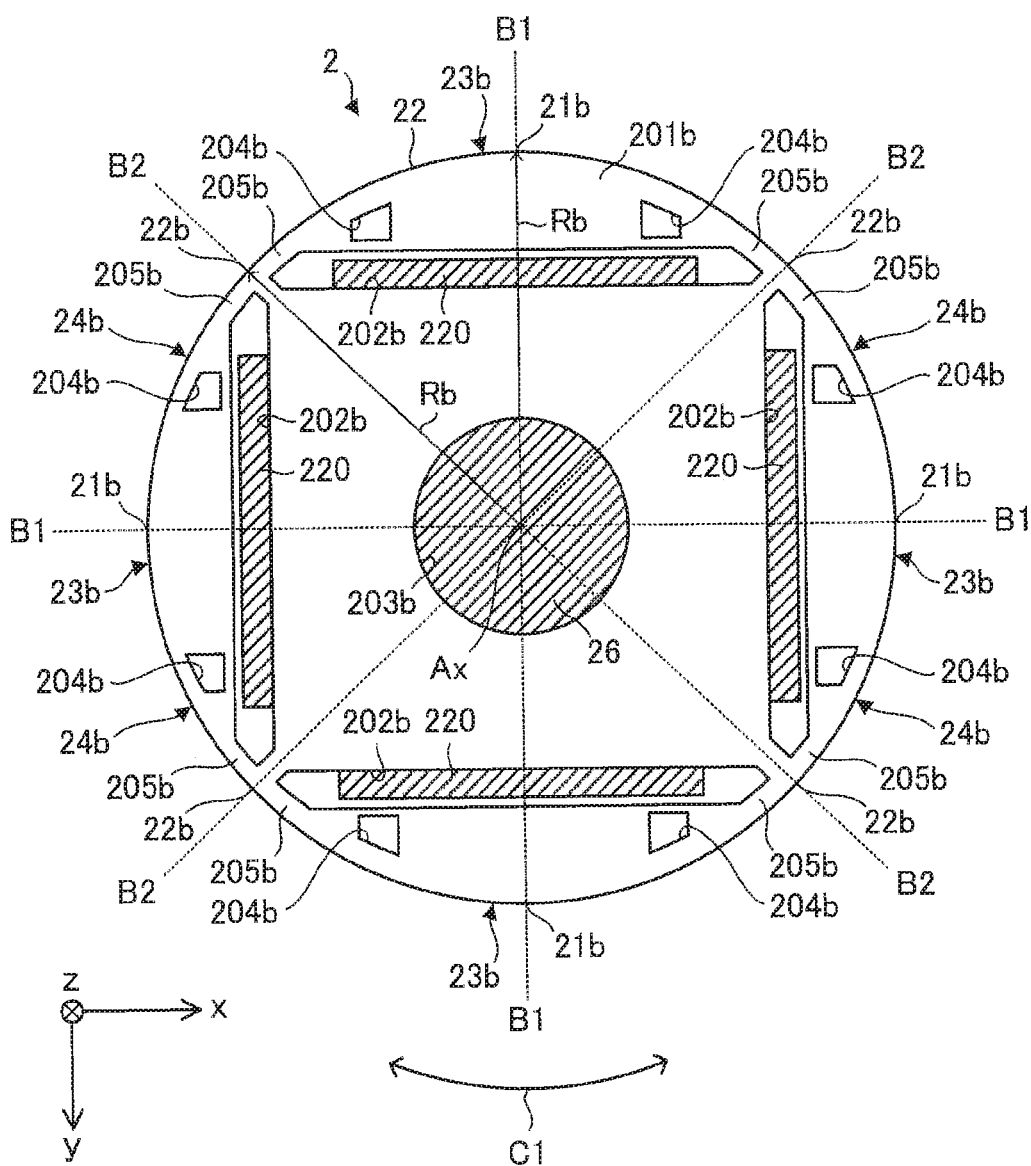
FIG. 5 is a cross-sectional view schematically illustrating the structure of a second side of the rotor.

FIG. 5 is a cross-sectional view schematically illustrating a structure of the second side of the rotor 2.

The second rotor core 22 includes a plurality of electromagnetic steel sheets 201b stacked in the axial direction, at least one hole 202b (also referred to as a second hole), a shaft hole 203b, at least one hole 204b, and at least one second thin-wall part 205b. The second rotor core 22 has a substantially cylindrical shape.

Each of the plurality of electromagnetic steel sheets 201b has a thickness of 0.1 mm or more and 1 mm or less in many cases. Each of the electromagnetic steel sheets 201b is formed by stamping into a predetermined shape. The at least one hole 202b, the shaft hole 203b, the at least one hole 204b, and the at least one second thin-wall part 205b are formed in each of the plurality of electromagnetic steel sheets 201b. The shaft hole 203b is formed at the center of the electromagnetic steel sheet 201b in a plane perpendicular to the axial direction, that is, the xy plane.

In this embodiment, the hole 202b is a hole closest to the inter-pole part among holes formed in the electromagnetic steel sheet 201b (except for the shaft hole 203b) in the plane perpendicular to the axial direction, that is, in the xy plane. In the example illustrated in FIG. 5, the permanent magnets 220 are inserted in the holes 202b. The shape of the holes 202b is the same as the shape of the holes 202a. The shape of the holes 202b may be different from the shape of the holes 202a.

In the example illustrated in FIG. 5, a plurality of holes 202b (specifically four holes 202b) are arranged in the circumferential direction. In the example illustrated in FIG. 5, the number of holes 202b is equal to the number of magnetic poles of the rotor 2.

In the example illustrated in FIG. 5, the permanent magnets 220 are inserted in the holes 202b. That is, one permanent magnet 220 is inserted in the hole 202a of the first rotor core 21 and the hole 202b of the second rotor core 22. That is, the hole 202b communicates with the hole 202a. The width of each permanent magnet 220 in the radial direction is smaller than the width of each hole 202b in the radial direction.

As illustrated in FIG. 5, the permanent magnet 220 is located on the inner side in the hole 202b in the radial direction. Thus, a gap is formed between the inner wall defining hole 202b and the outer surface of the permanent magnet 220 in the radial direction. In the gap, oil or a refrigerant may be present.

The at least one second thin-wall part 205b is located outside the hole 202b in the radial direction. Specifically, the at least one second thin-wall part 205b is formed between the hole 202b and the outer edge of the second rotor core 22. In the example illustrated in FIG. 5, a plurality of second thin-wall parts 205b (specifically eight second thin-wall parts 205b) are formed in the second rotor core 22. Each of the second thin-wall parts 205b extends along the circumferential direction.

The shape of the first thin-wall part 205a and the shape of the second thin-wall part 205b are the same. For example, in the xy plane, the first thin-wall part 205a and the second thin-wall part 205b have the same width in the radial direction. In addition, in the xy plane, the first thin-wall part 205a and the second thin-wall part 205b have the same length in the circumferential direction.

A distance from the rotation center of the rotor 2 (axis line Ax in FIG. 4) to the first thin-wall part 205a is equal to a distance from the rotation center of the rotor 2 (axis line Ax in FIG. 5) to the second thin-wall part 205b. In addition, an angle formed by a line passing through the rotation center of the rotor 2 and the first thin-wall part 205a (e.g., the barycenter of the first thin-wall part 205a) to the magnetic pole center part (e.g., a line passing through the rotation center of the rotor 2 and the first portion 21a in FIG. 4) in the xy plane is equal to an angle formed by a line passing through the rotation center of the rotor 2 and the second thin-wall part 205b (e.g., the barycenter of the second thin-wall part 205b) to the magnetic pole center part (e.g., a line passing through the rotation center of the rotor 2 and the first portion 21b in FIG. 5) in the xy plane. That is, in the xy plane, the position of the first thin-wall part 205a and the position of the second thin-wall part 205b in the rotor 2 are the same. In other words, in the xy plane, the position of the first thin-wall part 205a and the position of the second thin-wall part 205b overlap each other.

The shaft hole 203b of the second rotor core 22 communicates with the shaft hole 203a of the first rotor core 21. The shaft 26 is inserted in the shaft holes 203a and 203b formed in a center portion of the rotor 2 in the xy plane. The shaft 26 is fixed to the first rotor core 21 (specifically the shaft hole 203a) and the second rotor core 22 (specifically the shaft hole 203b), and rotatably supported only on the first side. Specifically, the shaft 26 is rotatably supported by the hearing 4 on the first side.

As illustrated in FIG. 5, the second rotor core 22 also includes first portions 21b located at the magnetic pole center parts of the rotor 2, second portions 22b located at the inter-pole parts of the rotor 2, outer peripheral surfaces 23b (also referred to as first outer peripheral surfaces) including the first portions 21b, and outer peripheral surfaces 24b (also referred to as second outer peripheral surfaces) including the second portions 22b.

In the xy plane, the first portions 21b are end portions of the second rotor core 22 in the radial direction. Similarly, in the xy plane, the second portions 22b are end portions of the second rotor core 22 in the radial direction. The first portions 21b and the second portions 22b form part of the outer edge of the second rotor core 22.

The outer peripheral surface of the second rotor core 22, that is, the outer peripheral surfaces 23b and 24b, has a curvature equal to that of the outer peripheral surface 24a of the first rotor core 21.

As illustrated in FIG. 3, the minimum distance G1 from the first rotor core 21 to the stator 3 in the radial direction is shorter than the minimum distance G2 from the second rotor core 22 to the stator 3 in the radial direction. The minimum distance G1 is a minimum distance of an air gap between the first rotor core 21 and the stator 3. The minimum distance G2 is a minimum distance of an air gap between the second rotor core 22 and the stator 3.

As illustrated in FIG. 4, a maximum radius of the first rotor core 21 is a distance Ra from the rotation center of the rotor 2 to the first portion 21a in the xy plane. That is, the maximum radius of the first rotor core 21 is the radius Ra of the first rotor core 21 in the magnetic pole center parts in the xy plane. The distance Wa from the rotation center of the rotor 2 to the second portions 22a in the xy plane is the radius Wa of the first rotor core 21 in the inter-pole parts.

As illustrated in FIG. 5, the maximum radius of the second rotor core 22 is a distance Rb (also referred to as a radius Rb) from the rotation center of the rotor 2 to the first portions 21b in the xy plane, and is also a radius of the second rotor core 22 in the magnetic pole center parts in the xy plane. In addition, the maximum radius of the second rotor core 22 is also the distance Rb from the rotation center of the rotor 2 to the second portions 22b in the xy plane. That is, in the xy plane, the radius of the second rotor core 22 in the magnetic pole center parts is equal to the radius of the second rotor core 22 in the inter-pole parts.

As illustrated in FIG. 3, the maximum radius Ra of the first rotor core 21 is larger than the maximum radius Rb of the second rotor core 22. That is, the maximum outer diameter of the first rotor core 21 (i.e., 2×Ra) is larger than the maximum diameter of the second rotor core 22 (i.e., 2×Rb).

The radius Wa of the first rotor core 21 in the inter-pole parts of the first rotor core 21 is equal to the radius Rb of the second rotor core 22 in the inter-pole parts of the second rotor core 22 (i.e., Wa=Rb). That is, the outer diameter of the first rotor core 21 in the inter-pole parts of the first rotor core 21 (i.e., 2×Wa) is equal to the outer diameter of the second rotor core 22 in the inter-pole parts of the second rotor core 22 (i.e., 2×Rb).

The number of magnetic poles of the first rotor core 21 is N2 (N2>2), and the number of magnetic poles of the second rotor core 22 is also N2. That is, the number of magnetic poles of the rotor 2 is also 142. In this embodiment, N2=4. Supposing the number of pole pairs of the first rotor core 21 is N1, N1=N2/2 is established, and the number of pole pairs of the second rotor core 22 is also N2/2. That is, the number of pole pairs of the rotor 2 is also N2/2.

Figure 6:
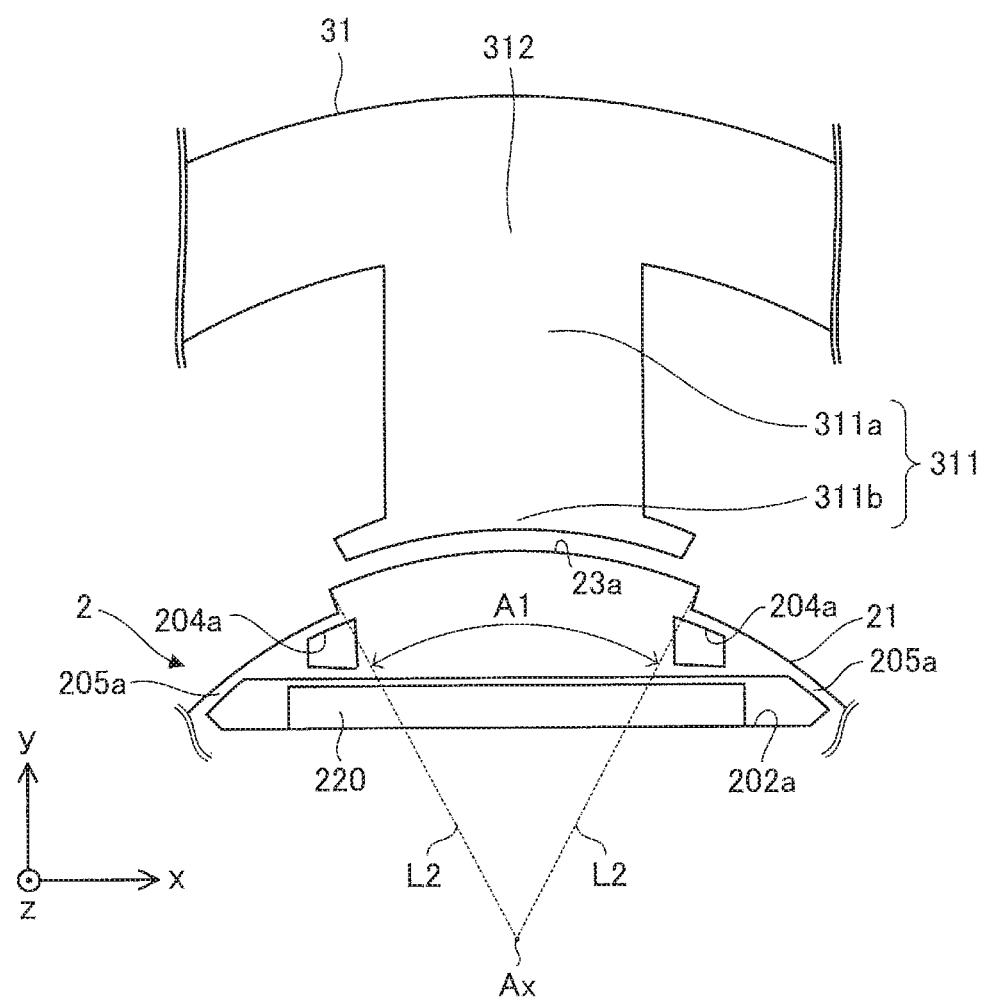
FIG. 6 is a diagram illustrating a positional relationship between a first rotor core and a stator core in an xy plane.

FIG. 6 is a diagram illustrating a positional relationship between the first rotor core 21 and the stator core 31 in the xy plane. FIG. 6 illustrates a portion of the first rotor core 21 and a portion of the stator core 31.

Each of the teeth 311 includes a main body 311a and a tooth front end 311b. The main body 311a extends in the radial direction. The tooth front end 311b extends in the circumferential direction, and faces the rotor 2 (specifically the first rotor core 21).

In a plane perpendicular to the axial direction, supposing an angle (mechanical angle) formed by two lines L2 passing through both ends of the outer peripheral surface 23a in the circumferential direction and the rotation center of the first rotor core 21 is A1 [degree], the electric motor 1 satisfies 87<A1×N1<130. In other words, the angle formed by two lines L2 is larger than 87 degrees and smaller than 130 degrees, in terms of electrical angles.

Figure 7:
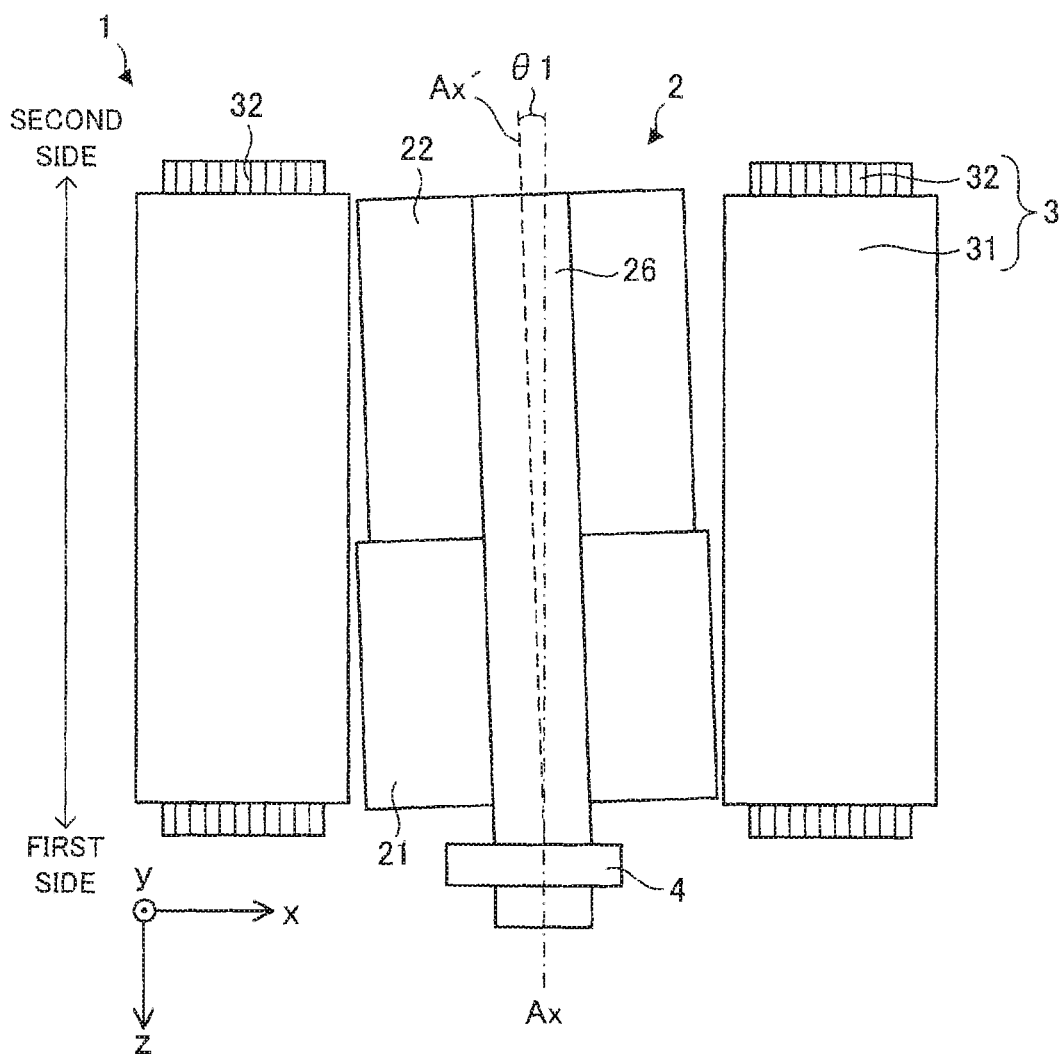
FIG. 7 is a diagram illustrating an example of a state of the rotor while the electric motor is being driven.

FIG. 7 is a diagram illustrating an example of a state of the rotor 2 while the electric motor 1 is being driven. The axis line Ax' represents the center of the shaft 26 illustrated in FIG. 7. In the example illustrated in FIG. 7, the axis line Ax', which is the rotation center of the rotor 2, is shifted from the axis line Ax that is originally set.

In the zx plane, supposing a tilt of the shaft 26 is θ1, the first side of the rotor 2, specifically, the maximum travel distance of the first rotor core 21 in the radial direction is expressed as (D1+T1)×sin θ1. Thus, the distance G1 (FIG. 3) needs to be larger than (D1+T1)×sin θ1. Thus, the electric motor 1 satisfies G1>(D1+T1)×sin θ1. Accordingly, it is possible to prevent the first side of the rotor 2, specifically, the first rotor core 21, from contacting the stator 3.

A distance D1 is a minimum distance from the first rotor core. 21 to the bearing 4. A thickness T1 is a thickness of the first rotor core 21 in the axial direction. The tilt θ1 is a maximum tilt of the shaft 26 in a plane parallel to the axial direction, that is, the zx plane. Specifically, the tilt θ1 is a maximum tilt of the shaft 26 from the axis line Ax in the ax plane. In other words, the tilt θ1 is an angle in a case where the second side of the rotor 2, specifically, the second rotor core, contacts the stator 3. The distance G1 is a minimum distance from the first rotor core 21 to the stator 3 in a case where the rotation center of the rotor 2 and the stator 3 coincide with each other in the xy plane.

Variations

Figure 8:
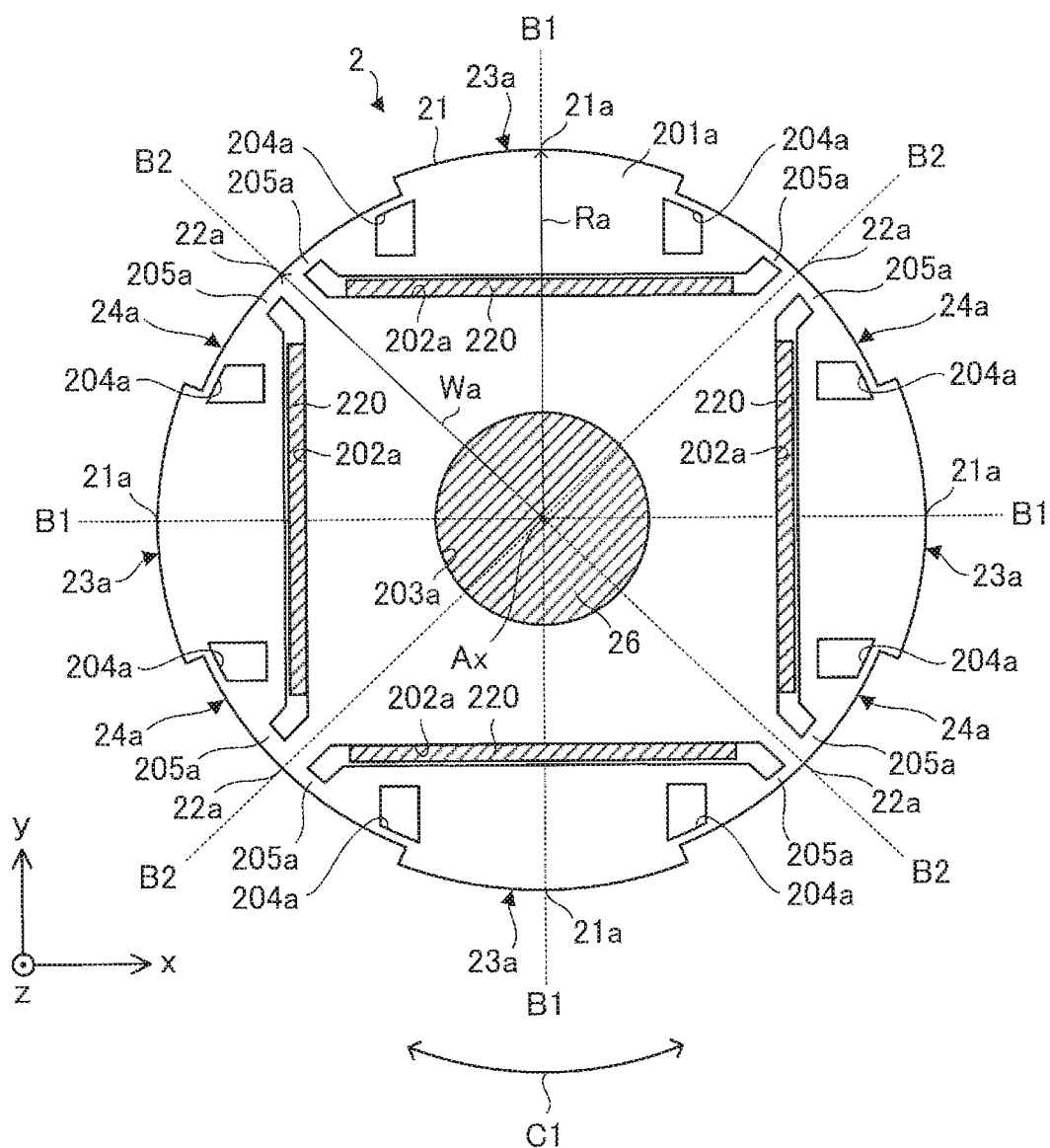
FIG. 8 is a plan view illustrating another example of the structure of the first rotor core.
Figure 9:
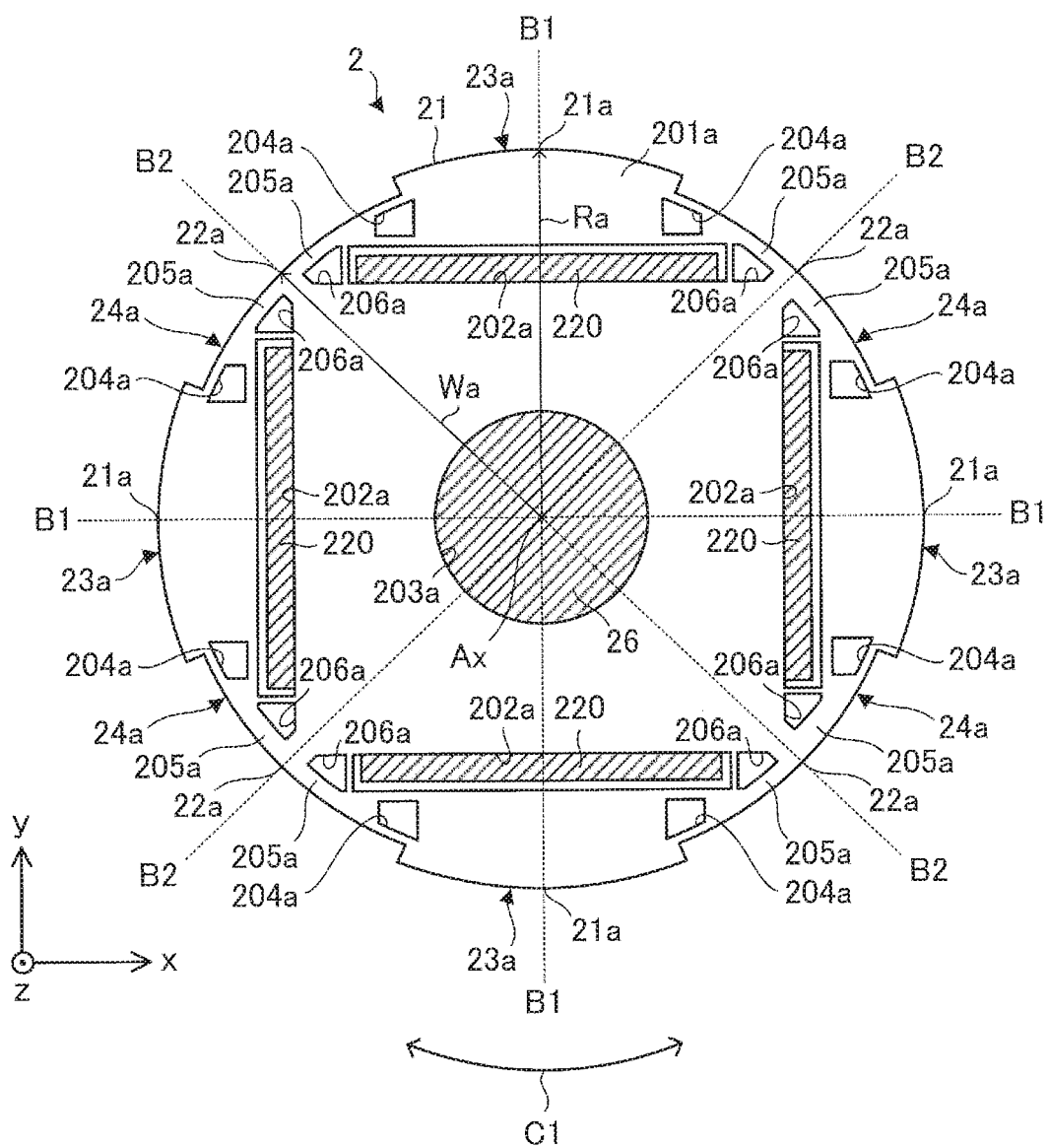
FIG. 9 is a plan view illustrating yet another example of the structure of the first rotor core.
Figure 10:
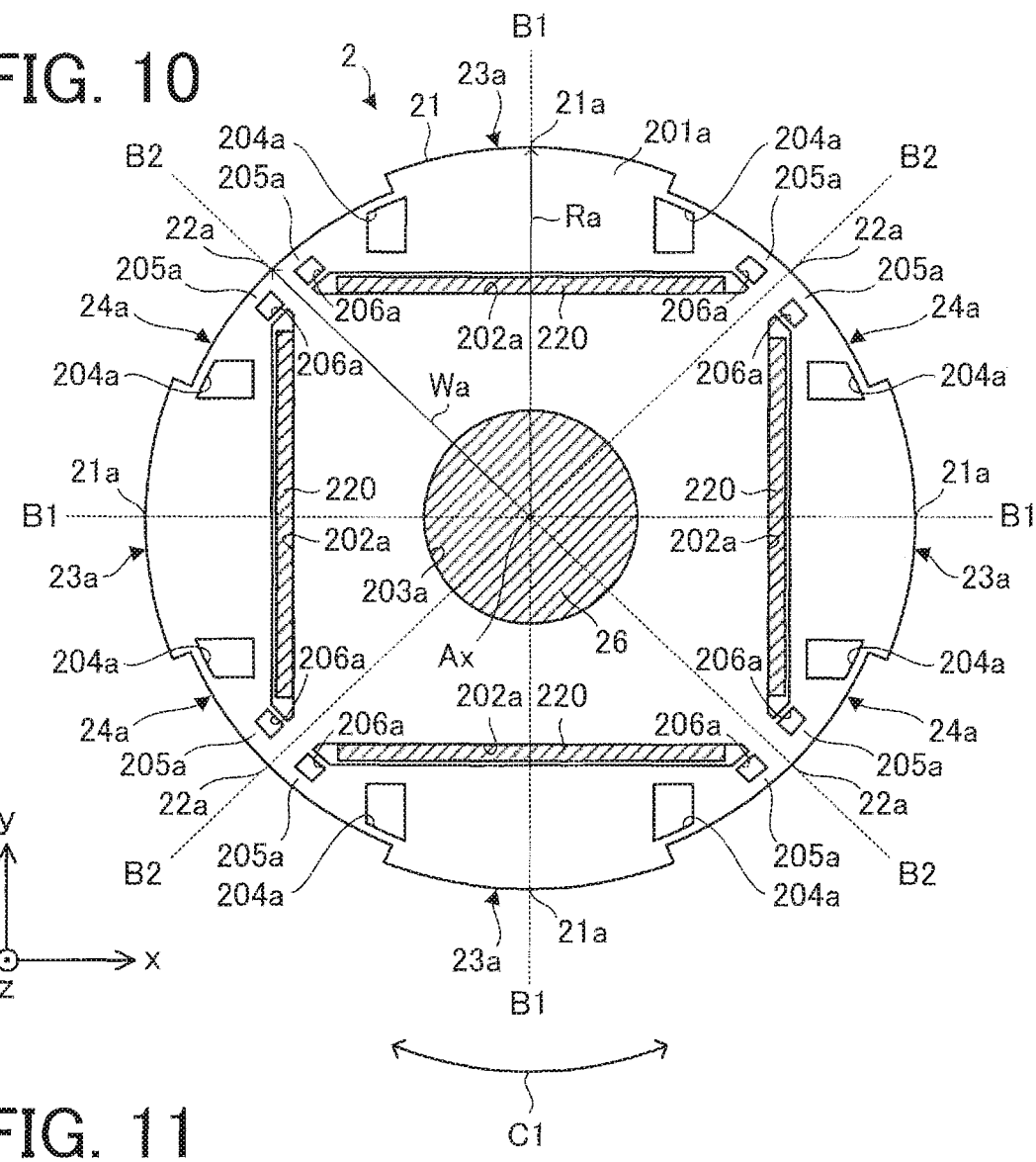
FIG. 10 is a plan view illustrating still another example of the structure of the first rotor core.

FIGS. 8, 9, and 10 are plan views illustrating other examples of the structure of the first rotor core 21. In the second rotor core 22, the structure except for the outer edge can be formed similarly to the structure of the first rotor core 21 shown an FIGS. 8, 9, and 10.

In the example illustrated in FIG. 8, the shape of the hole 202a is different from the hole 202a described in the first embodiment. Specifically, both ends of the hole 202a illustrated in FIG. 8, specifically, both ends of the hole 202a in the longitudinal direction in the xy plane, extend in the radial direction. The longitudinal direction of the hole 202a is a direction perpendicular to the magnetic pole center line B1 in the xy plane. In this case, the shape of the hole 202b of the second rotor core 22 is also the same as that of the hole 202a. The position and shape of the thin-wall part of the second rotor core 22 are the same as those of the first thin-wall part 205a.

In the example illustrated in FIG. 9, the first rotor core 21 also includes at least one hole 206a. In the xy plane, the hole 206a is formed outside the hole 202a in the longitudinal direction. The longitudinal direction of the hole 202a is a direction perpendicular to the magnetic pole center line B1 in the xy plane. In the example illustrated in FIG. 9, the hole 206a is a hole closest to an inter-pole part among holes formed in the electromagnetic steel sheet 201a (except for the shaft hole 203a) in a plane perpendicular to the axial direction, that is, in the xy plane. In the example illustrated in FIG. 9, the first thin-wall part 205*a* is formed between the hole 206*a* and the outer edge of the first rotor core 21. In this case, the second rotor core 22 also has a hole similar to the hole 206*a* of the first rotor core 21. The position and shape of the thin-wall part of the second rotor core 22 are the same as those of the first thin-wall part 205*a*.

In the example illustrated in FIG. 10, the first rotor core 21 also includes at least one hole 206*a*. In the xy plane, the hole 206*a* is formed outside the hole 202*a* in the longitudinal direction and between the hole 202*a* and the outer edge of the first rotor core 21. The longitudinal direction of the hole 202*a* is a direction perpendicular to the magnetic pole center line B1 in the xy plane. In the example illustrated in FIG. 10, the hole 206*a* is a hole closest to an inter-pole part among holes formed in the electromagnetic steel sheet 201*a* (except for the shaft hole 203*a*) in a plane perpendicular to the axial direction, that is, in the xy plane. In the example illustrated in FIG. 10, the first thin-wall part 205*a* is formed between the hole 206*a* and the outer edge of the first rotor core 21. In this case, the second rotor core 22 also has a hole similar to the hole 206*a* of the first rotor core 21. The position and shape of the thin-wall part of the second rotor core 22 are the same as those of the first thin-wall part 205*a*.

Advantages of the electric motor 1 according to this embodiment will be described hereinafter.

In general, an air gap between a stator and a rotor is designed narrow. This can reduce magnetic resistance en an electric motor and avoid a decrease in a magnetic force. However, in a case where the shaft of the rotor is rotatably supported only on one side in the axial direction, the rotor is subjected to a magnetic force in the radial direction so that the shaft of the rotor might be warped. In view of this, in the case where the shaft of the rotor is rotatably supported only on one end in the axial direction, an air gap between the stator and the rotor is preferably designed wide. However, as the size of the air gap increases, the magnetic force decreases.

In an electric motor using a permanent magnet, a magnetic force of the permanent magnet is large in the radial direction, and thus, the shaft of the rotor is easily warped. Thus, in the case where the shaft of the rotor is rotatably supported by the bearing only on one side in the axial direction, the bearing side of the shaft serves as a fulcrum, and the shaft might be warped. In this case, an air gap on the counter bearing side is narrower than an air gap on the bearing side. Thus, in a conventional electric motor, to prevent contact of the counter bearing side of the rotor core with the stator, the outer diameter of the rotor core needs to be small. However, if the outer diameter of the rotor core is small, an air gap becomes wide in some portions, and as a result, a magnetic force decreases.

In the electric motor 1 according to this embodiment, the minimum distance G1 from the first rotor core 21 to the stator 3 in the radial direction is smaller than the minimum distance G2 from the second rotor core 22 to the stator 3 in the radial direction. Accordingly, in consideration of warpage of the shaft 26, an air gap between the stator 3 and the rotor 2 can be appropriately set. That is, in the electric motor 1 using the permanent magnet 220, since a magnetic force of the permanent magnet 220 is large in the radial direction, the shaft 26 of the rotor 2 is easily warped. Even in a case where the shaft 26 of the rotor 2 is warped, the second side of the rotor 2 does not contact the stator 3, and a narrow air gap on the second side (e.g., the minimum distance G2) is maintained. In addition, since the minimum distance G1 on the first side is smaller than the minimum distance G2 on the second side, the air cap on the first side (e.g., the minimum distance G1) can be also maintained narrow. Consequently, a decrease, in a magnetic force in the electric motor 1 can be prevented.

The electric motor 1 includes the first rotor core 21 and the second rotor core 22 having different maximum outer diameters. That is, the rotor 2 includes two types of rotor cores. Specifically, to set an air gap on the first side smaller than an air gap on the second side, it is preferable to appropriately maintain air gaps in the electric motor 1 with a minimum configuration. In general, electromagnetic steel sheets constituting a rotor core are formed by press work. If design of the rotor core, for example, the shapes of the first rotor core 21 and the second rotor core 22, is different in many portions, molds are individually needed for processing electromagnetic steel sheets of the first rotor core 21 and the second rotor core 22, and thus, costs increase. On the other hand, in the electric motor 1 according to this embodiment, it is sufficient to change the shapes of the two types of rotor cores, that is, the first rotor core 21 and the second rotor core 22, only for portions where the air gap on the first side is set smaller than the air gap on the second side. Thus, processing costs and mold costs can be reduced.

The stator 3 (specifically the stator core 31) has a uniform curvature radius of the inner peripheral surface. That is, in the xy plane, the distance from the axis line Ax to the teeth 311 is uniform in the circumferential direction. Accordingly, by setting the radii of the first rotor core 21 and the second rotor core 22 individually, the sizes of the two types of air gaps (i.e., the minimum distances G1 and G2) can be adjusted. In addition, since the inner peripheral surface of the stator 3 has a uniform curvature radius, the winding 32 can be easily wound. Moreover, in the process of fabricating the electric motor 1, the stator 3 can be conveyed by using the inner peripheral surface of the stator 3 (e.g., the surface of the tooth front end 311*b*).

In the electric motor 1 according to this embodiment, the maximum radius of the first rotor core 21 (specifically the radius Ra) is larger than the maximum radius of the second rotor core 22 (specifically the radius Rb). Accordingly, the size of the air gap on the first side of the rotor 2 can be reduced. In general, when the outer diameter of a rotor core is increased in order to reduce the size of an air gap, the width of a thin-wall part in the radial direction increases. If the width of the thin-wall part increases, the strength to a centrifugal force generated in the rotor core increases. On the other hand, if the width of the thin-wall part increases, leakage of magnetic fluxes near the inter-pole part easily occurs.

In the electric motor 1, the shape of the first thin-wall part 205*a* and the shape of the second thin-wall part 205*b* are the same. A distance from the rotation center of the rotor 2 (axis line Ax in FIG. 4) to the first thin-wall part 205*a* is equal to a distance from the rotation center of the rotor 2 (axis line Ax in FIG. 5) to the second thin-wall part 205*b*. In addition, an angle formed by a line passing through the rotation center of the rotor 2 and the first thin-wall part 205*a* to the magnetic pole center part in the xy plane is equal to an angle formed by a line passing through the rotation center of the rotor 2 and the second thin-wall part 205*b* to the magnetic pole center part in the xy plane. That is, in the xy plane, the position of the first thin-wall part 205*a* and the position of the second thin-wall part 205*b* in the rotor 2 are the same. Accordingly, in a manner similar to the second thin-wall part 205*b*, the width of the first thin-wall part 205*a* in the radial direction can be reduced, and thus, leakage of magnetic fluxes near the inter-pole part can be reduced. Moreover, in this state, the radius of the first rotor core 21 in the magnetic pole center part is larger than the radius of the second rotor core 22 in the magnetic pole center part. Thus, the air gap on the first side of the rotor 2 can be made small. Consequently, leakage of magnetic fluxes near the inter-pole part of the rotor 2 can be reduced, and a magnetic force in the electric motor 1, especially a magnetic force on the first side of the rotor 2, can be enhanced.

The shape of the hole 202a of the first rotor core 21 is preferably the same as the shape of the hole 202b of the second rotor core 22, and the curvature of the outer peripheral surface 24a of the first rotor core 21 is preferably equal to the curvature of the outer peripheral surfaces 23b and the 24b of the second rotor core 22. Accordingly, the first thin-wall part 205a can be formed to have the same shape as that of the second thin-mall part 205b.

When the shape of the hole 202a of the first rotor core 21 is the same as that of the hole 202b of the second rotor core 22, the shape on the first side of the permanent magnet 220 and the shape on the second side of the permanent magnet 220 can be made the same. Thus, one permanent magnet 220 can be disposed on the first side and the second side of the rotor 2, that is, in the holes 202a and 202b, and thus, the number of permanent magnets 220 can be reduced, the process of inserting the permanent magnet 220 can be easily performed, and costs for fabricating the electric motor 1 can be reduced.

In the case where the shape of the hole 202a of the first rotor core 21 is the same as the shape of the hole 202b of the second rotor core 22, the holes 202a and 202b can be formed with a common mold. Thus, mold costs can be reduced.

Figure 11:
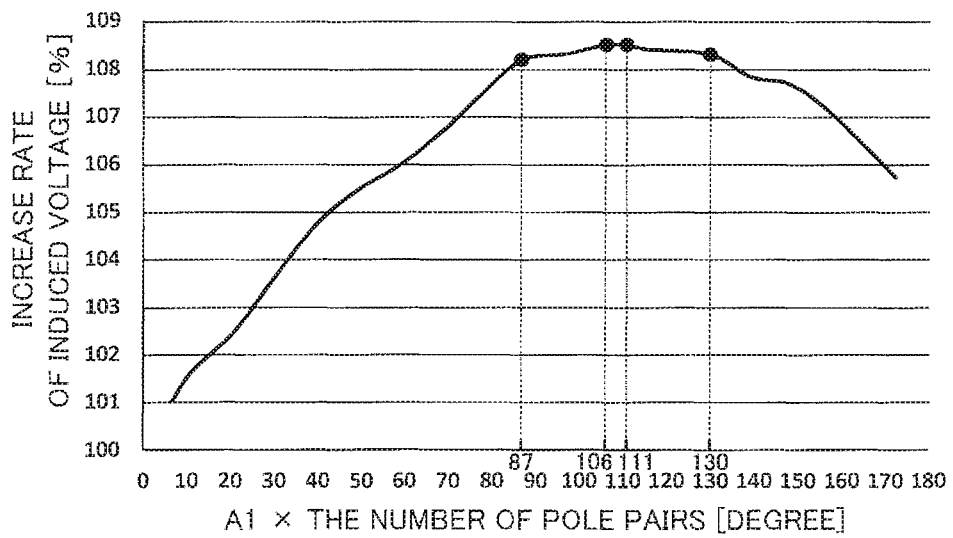
FIG. 11 is a graph showing a relationship between an angle [degree] formed by two lines passing through both ends of an outer peripheral, surface in a circumferential direction and a rotation center of the first rotor core and an increase rate [%] of an induced voltage.

FIG. 11 is a graph showing a relationship between an angle [degree] formed by two lines L2 passing both ends of the outer peripheral surface 23a in the circumferential direction and the rotation center of the first rotor core 21 and an increase rate [%] of an induced voltage. The vertical axis represents an increase rate of an induced voltage in the electric motor 1 with reference to an electric motor including a rotor in which the outer edge of a rotor core in the xy plane is a complete circle. The horizontal axis represents an electrical angle.

As illustrated in FIG. 11, if the angle formed by the two lines L2 is from 0 degrees to 87 degrees, the induced voltage increases. If the angle formed by the two lines L2 exceeds 130 degrees, the induced voltage decreases. Specifically, if the angle formed by the two lines L2 is from 0 degrees to 87 degrees, an induced voltage increases as the outer peripheral surface 23a becomes longer in the circumferential direction. That is, as a region where the air gap is small is longer in the circumferential direction, the induced voltage increases. If the angle formed by the two lines L2 exceeds 130 degrees, the outer peripheral surface 23a reaches the first thin-wall part 205a. That is, the width of the first thin-wall part 205a increases by the width of the outer peripheral surface 23a in the radial direction, and leakage of magnetic fluxes increases.

Thus, when the electric motor 1 satisfies $87<A1\times N1<130$, leakage of magnetic fluxes can be reduced and the induced voltage can be increased. In addition, when the electric motor 1 satisfies $90<A1*N1<130$, the induced voltage can be effectively increased. Furthermore, when the electric motor 1 satisfies $106<A1*N1<111$, the induced voltage can be more effectively increased.

The electric motor 1 preferably satisfies $G1>(D+T1)\times\sin\theta1$ and $G2>G1$. Similarly, the electric motor 1 preferably satisfies $G1>G2\times(D1+T1)/L1$ and $G2>G1$. Accordingly, even when the rotor 2 tilts, it is possible to prevent contact of the first side of the rotor 2, specifically the first rotor core 21, with the stator 3.

As described above, since the electric motor 1 has the structure described above, leakage of magnetic fluxes in the rotor 2 can be reduced, and a magnetic force in the electric motor 1 can be enhanced.

Second Embodiment

A compressor 6 according to a second embodiment of the present invention will be described.

Figure 12:
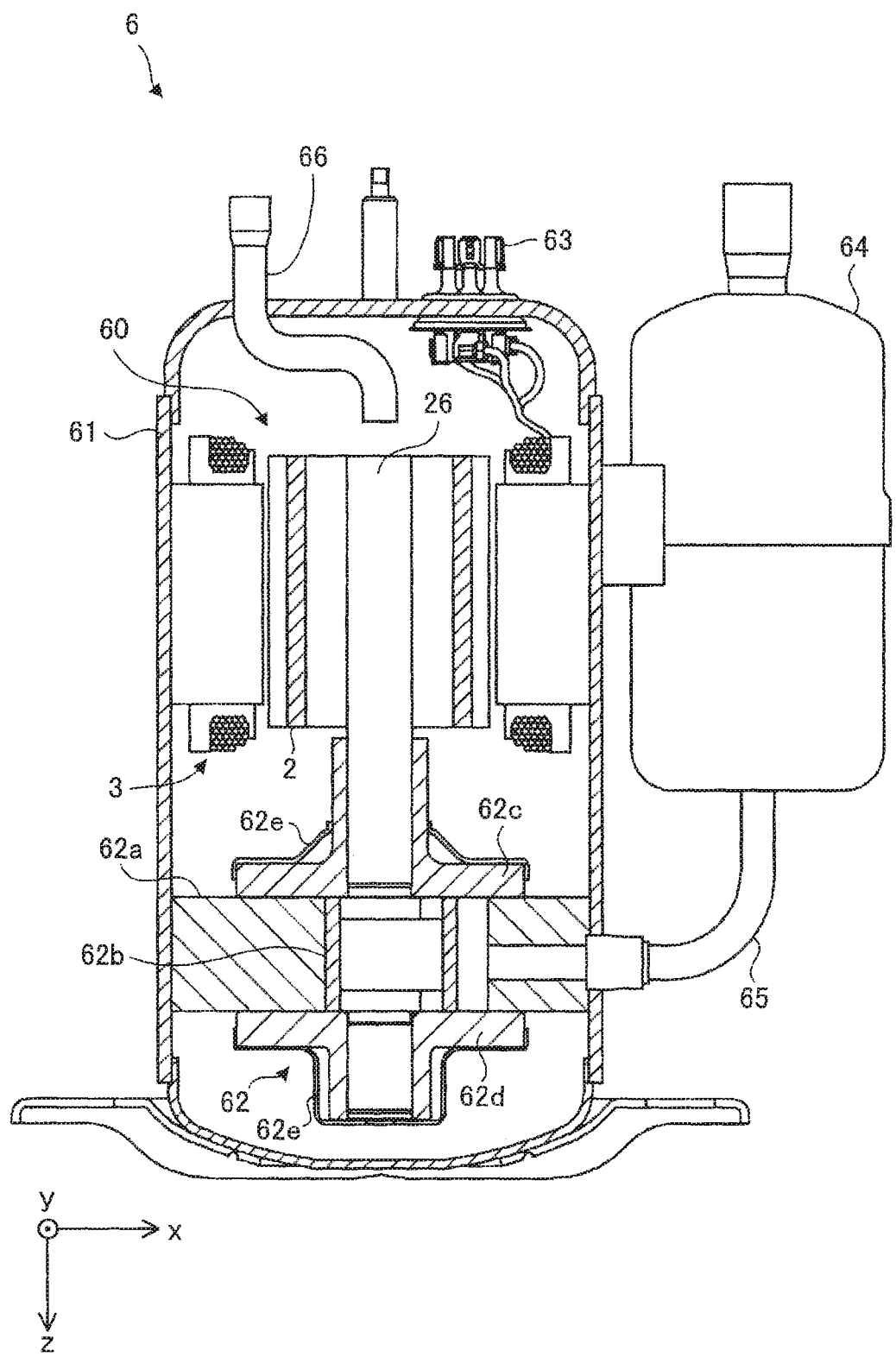
FIG. 12 is a cross-sectional view schematically illustrating a structure of a compressor according to a second embodiment.

FIG. 12 is a cross-sectional view schematically illustrating a structure of the compressor 6 according to the second embodiment.

The compressor 6 includes an electric motor 60 serving as an electric element, a closed container 61 serving as a housing, and a compression mechanism 62 serving as a compression element. In this embodiment, the compressor 6 is a rotary compressor. However, the compressor 6 is not limited to the rotary compressor.

The electric motor 60 is the electric motor 1 according to the first embodiment. In this embodiment, the electric motor 60 is an interior permanent magnet electric motor, but is not limited to this type.

The closed container 61 covers the electric motor 60 and the compression mechanism 62. In a bottom portion of the closed container 61, refrigerating machine oil for lubricating a sliding portion of the compression mechanism 62 is stored.

The compressor 6 also includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e individually attached to the upper frame 62c and the lower frame 62d. The compression mechanism 62 also includes a vane that divides the inside of the cylinder 62a into a suction side and a compression side. The compression mechanism 62 is driven by the electric motor 60.

The electric motor 60 is fixed in the closed container 61 by press fitting or shrink fitting. A stator 3 may be directly, attached to the closed container 61 by welding, instead of press fitting or shrink fitting.

Electric power is supplied to a winding of the stator 3 of the electric motor 60 through the glass terminal 63.

A rotor (specifically one end of a shaft 26) of the electric motor 60 is rotatably supported by a bearing provided on each of the upper frame 62c and the lower frame 62d.

The shaft 26 is inserted in a piston 62b. The shaft 26 is rotatably inserted in the upper frame 62c and the lower frame 62d. The upper frame 62c and the lower frame 62d close an end face of the cylinder 62a. The accumulator 64 supplies a refrigerant (e.g., refrigerant gas) to the cylinder 62a through the suction pipe 65.

Next, an operation of the compressor 6 will be described. Refrigerant supplied from the accumulator 64 is sucked into the cylinder 62a from the suction pipe 65 fixed to the closed container 61. The electric motor 60 rotates by electrification of an inverter so that the piston 62b fitted to the shaft 26 rotates in the cylinder 62a. In this manner, the refrigerant is compressed in the cylinder 62a.

The refrigerant passes through the mufflers 62e and rises in the closed container 61. Refrigerating machine oil is mixed in the compressed refrigerant. While the mixture of the refrigerant and the refrigerating machine oil is passing through an air hole 36 formed in a rotor core, separation between the refrigerant and the refrigerating machine oil is promoted, and accordingly, a flow of the refrigerating machine oil into the discharge pipe 66 can be prevented. In this manner, the compressed refrigerant is supplied to a high-pressure side of a refrigerant cycle through the discharge pipe 66.

As a refrigerant for the compressor 6, R410A, R407C, or R22, for example, can be used. However, the refrigerant for the compressor 6 is not limited to these examples. For example, as a refrigerant for the compressor 6, a refrigerant having a small global warming potential (GWP) or the like can be used.

Typical examples of the refrigerant having a small GWP includes the following refrigerants.

(1) Halogenated hydrocarbon including a carbon double bond in a composition is, for example, HFO-1234yf (CF3CF=CH2). HFO stands for Hydro-Fluoro-Olefin. Olefin is unsaturated hydrocarbon having one double bond. The GWP of HFO-1234yf is 4.

(2) Hydrocarbon having a carbon double bond in a composition is, for example, R1270 (propylene). The GWP of the R1270 is 3, which is smaller than the GWP of HFO-1234yf, but flammability of R1270 is higher than flammability of HFO-1234yf.

(3) A mixture including at least one of halogenated hydrocarbon having a carbon double bond in a composition or hydrocarbon having a carbon double bond in a composition is, for example, a mixture of HFO-1234yf and R32. Since HFO-1234yf is a low-pressure refrigerant, a pressure loss is large, and performance in a refrigeration cycle (especially in an evaporator) tends to degrade. Thus, it is preferable to use a mixture with, for example, R32 or R41, which is a high-pressure refrigerant.

The compressor 6 according to the second embodiment has advantages described in the first embodiment.

In addition, the use of the electric motor 1 according to the first embodiment as the electric motor 60 can enhance efficiency of the electric motor 60, and as a result, efficiency of the compressor 6 can be enhanced.

Third Embodiment

An air conditioner 50 (also referred to as a refrigerating and air conditioning apparatus or a refrigeration cycle device) according to a third embodiment of the present invention will be described.

Figure 13:
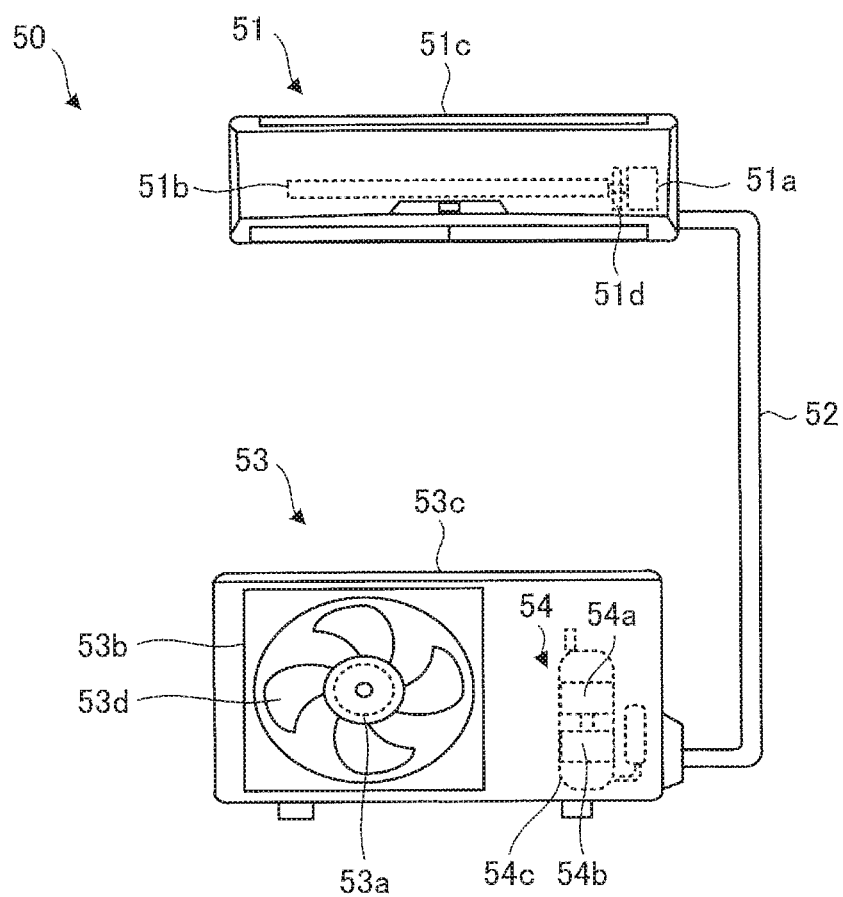
FIG. 13 is a diagram schematically illustrating a configuration of an air conditioner according to a third embodiment.

FIG. 13 is a diagram schematically illustrating a configuration of the air conditioner 50 according to the third embodiment.

The air conditioner 50 according to the third embodiment includes an indoor unit 51 serving as an air blower (first air blower), a refrigerant pipe 52, and an outdoor unit 53 serving as an air blower (second air blower) connected to the indoor unit 51 through the refrigerant pipe 52.

The indoor unit 51 includes an electric motor 51a (e.g., the electric motor 1 according to the first embodiment), an air blow unit 51b that is driven by the air electric motor 51a to thereby send air, and a housing 51c covering the electric motor 51a and the air blow unit 51b. The air blow unit 51b includes a blade 51d that is driven by the electric motor 51a, for example. For example, the blade 51d is fixed to a shaft (e.g., a shaft 26) of the electric motor 51a, and generates an airflow.

The outdoor unit 53 includes an electric motor 53a (e.g., the electric motor 1 according to the first embodiment), an air blow unit 53b, a compressor 54, and a heat exchanger (not shown). The air blow unit 53b is driven by the electric motor 53a to thereby send air. The air blow unit 53b includes a blade 53d that is driven by the electric motor 53a, for example. For example, the blade 53d is fixed to a shaft (e.g., a shaft 26) of the electric motor 53a, and generates an airflow. The compressor 54 includes an electric motor 54a (e.g., the electric motor 1 according to the first embodiment), a compression mechanism 54b (e.g., a refrigerant circuit) that is driven by the electric motor 54a, and a housing 54c covering the electric motor 54a and the compression mechanism 54b. The compressor 54 is, for example, the compressor 6 described in the second embodiment.

In the air conditioner 50, at least one of the indoor unit 51 or the outdoor unit 53 includes the electric motor 1 described in the first embodiment. Specifically, as a driving source of the air blow unit, the electric motor 1 described in the first embodiment is applied to at least one of the electric motors 51a or 53a. As an electric motor 54a of the compressor 54, the electric motor 1 described in the first embodiment may be used.

The air conditioner 50 can perform operations such as a cooling operation of sending cold air from the indoor unit 51 or a heating operation of sending warm air from the indoor unit 51, for example. In the indoor unit 51, the electric motor 51a is a driving source for driving the air blow unit 51b. The air blow unit 51b can send conditioned air.

In the air conditioner 50 according to the third embodiment, since the electric motor 1 described in the first embodiment is applied to at least one of the electric motors 51a or 53a, the same advantages as those described in the first embodiment can be obtained. Accordingly, efficiency of the air conditioner 50 can be enhanced.

In addition, as a driving source of an air blower (e.g., the indoor unit 51), the electric motor 1 according to the first embodiment is used. Thus, the same advantages as those described in the first embodiment can be obtained. In this manner, efficiency of the air blower can be enhanced. An air blower including the electric motor 1 according to the first embodiment and the blade (e.g., the blade 51d or 53d) driven by the electric motor 1 can be used singly as a device for sending air. This air blower is also applicable to devices other than the air conditioner 50.

The use of the electric motor 1 according to the first embodiment as a driving source of the compressor 54 can obtain the same advantages as those described in the first embodiment. Accordingly, efficiency of the compressor 54 can be enhanced.

The electric motor 1 described in the first embodiment can be mounted on equipment including a driving source, such as a ventilator, household electrical appliance, or a machine tool, other than the air conditioner 50.

Features of the embodiments described above may be combined as appropriate.

DESCRIPTION OF REFERENCE CHARACTERS 1, 51a, 53a, 54a, 60 electric motor, 2 rotor, 3 stator, 4 bearing, 6 compressor, 21 first rotor core, 21a, 21b first portion, 22a, 22b second portion, 23a, 23b outer peripheral surface (first outer peripheral surface), 24a, 24b outer peripheral surface (second outer peripheral surface), 22 second rotor core, 26 shaft, 31 stator core, 50 air conditioner, 51 indoor unit (air blower), 53 outdoor unit (air blower), 201a, 201b electromagnetic steel sheet, 202a, 202b hole, 205a first thin-wall part, 205b second thin-wall part, 220 permanent magnet, 311 tooth.

What is claimed is:

1. An electric motor comprising:
a stator; and
a rotor including a shaft, a first rotor core fixed on a first side of the shaft in an axial direction, and a second rotor core fixed on a second side of the shaft, the second side being opposite to the first side in the axial direction, the rotor being disposed inside the stator, wherein
the shaft is supported only on the first side,
a minimum distance from the first rotor core to the stator in a radial direction is shorter than a minimum distance from the second rotor core to the stator in the radial direction,
a maximum radius of the first rotor core is longer than a maximum radius of the second rotor core,
the first rotor core includes a first hole and a first thin-wall part, the first thin-wall part being located outside the first hole in the radial direction and being a region between an end of the first hole in a longitudinal direction of the first hole and an outer edge of the first rotor core,
the second rotor core includes a second hole and a second thin-wall part, the second thin-wall part being located outside the second hole in the radial direction and being a region between an end of the second hole in a longitudinal direction of the second hole and an outer edge of the second rotor core,
a shape of the first thin-wall part and a shape of the second thin-wall part are the same in a plane perpendicular to the axial direction, and
the first thin-wall part and the second thin-wall part overlap each other in the axial direction.

2. The electric motor according to claim 1, wherein
the first rotor core includes a first portion that is an end portion of the first rotor core in the radial direction, a second portion that is an end portion of the first rotor core in the radial direction, a first outer peripheral surface including the first portion, and a second outer peripheral surface including the second portion, the first portion being located at a magnetic pole center part of the rotor, the second portion being located at an inter-pole part of the rotor, and
the first outer peripheral surface projects outward in the radial direction compared with the second outer peripheral surface.

3. The electric motor according to claim 2, wherein
the electric motor satisfies $87 < A1 \times N1 < 130$
where N1 is the number of pole pairs in the first rotor core, and A1 [degree] is an angle formed by two lines passing through both ends of the first outer peripheral surface in the circumferential direction and a rotation center of the first rotor core in a plane perpendicular to the axial direction.

4. The electric motor according to claim 1, wherein
a radius of the first rotor core in an inter-pole part of the first rotor core is equal to a radius of the second rotor core in an inter-pole part of the second rotor core.

5. The electric motor according to claim 1, further comprising a bearing supporting the first side of the shaft, wherein the electric motor satisfies
$G1 > G2 \times (D1+T1)/L1$
where L1 is a minimum distance from an end of the shaft on the second side in the axial direction to the bearing, D1 is a minimum distance from the first rotor core to the bearing, T1 is a thickness of the first rotor core in the axial direction, G1 is a minimum distance from the first rotor core to the stator in a case where a rotation center of the rotor coincides with a center of the stator in a plane perpendicular to the axial direction, and G2 is a minimum distance from the second rotor core to the stator in a case where the rotation center of the rotor coincides with the center of the stator.

6. The electric motor according to claim 1, further comprising
a bearing supporting the first side of the shaft, wherein the electric motor satisfies
$G1 > (D1+T1) \times \sin\theta 1$
where D1 is a minimum distance from the first rotor core to the bearing, T1 is a thickness of the first rotor core in the axial direction, θ1 is a maximum tilt of the shaft in a plane parallel to the axial direction, and G1 is a minimum distance from the first rotor core to the stator in a case where a rotation center of the rotor coincides with a center of the stator in a plane perpendicular to the axial direction.

7. An electric motor according to claim 1, wherein
a distance from a rotation center of the rotor to the first thin-wall part is equal to a distance from the rotation center of the rotor to the second thin-wall part.

8. The electric motor according to claim 1, wherein
an angle formed by a line passing through a rotation center of the rotor and the first thin-wall part to a magnetic pole center part of the rotor in a plane perpendicular to the axial direction is equal to an angle formed by a line passing through the rotation center of the rotor and the second thin-wall part to a magnetic pole center part in the plane perpendicular to the axial direction.

9. A compressor comprising:
the electric motor according to claim 1;
a compression mechanism that is driven by the electric motor; and
a housing covering the electric motor and the compression mechanism.

10. An air blower comprising:
the electric motor according to claim 1; and
a blade to be driven by the electric motor.

11. A refrigerating and air conditioning apparatus comprising:
an indoor unit; and
an outdoor unit connected to the indoor unit, wherein
at least one of the indoor unit or the outdoor unit includes the electric motor according to claim 1.

12. The electric motor according to claim 1, wherein a position of the first thin-wall part and a position of the second thin-wall part are the same in a plane perpendicular to the axial direction.

* * * * *